(12) United States Patent  (10) Patent No.: US 8,526,082 B2
Shimizu  (45) Date of Patent: Sep. 3, 2013

(54) IMAGE READING APPARATUS, IMAGE FORMING APPARATUS, IMAGE INFORMATION CORRECTION METHOD AND COMPUTER READABLE MEDIUM

(75) Inventor: Kosuke Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 637 days.

(21) Appl. No.: 12/773,353

(22) Filed: May 4, 2010

(65) Prior Publication Data

US 2011/0007372 A1  Jan. 13, 2011

(30) Foreign Application Priority Data

Jul. 13, 2009  (JP) ................................ 2009-165123

(51) Int. Cl.
*G03F 3/08* (2006.01)
*H04N 1/60* (2006.01)
*H04N 1/46* (2006.01)

(52) U.S. Cl.
USPC .......................... 358/518; 358/1.9; 358/505

(58) Field of Classification Search
USPC .................... 358/1.9, 518, 520, 505
See application file for complete search history.

(56) References Cited

U.S. PATENT DOCUMENTS

| | | | | |
|---|---|---|---|---|
| 6,542,259 | B1* | 4/2003 | Andersen et al. | 358/1.9 |
| 7,864,374 | B2* | 1/2011 | Kondo | 358/1.9 |
| 7,986,447 | B2* | 7/2011 | Bang et al. | 358/518 |
| 2002/0097437 | A1* | 7/2002 | Fujita et al. | 358/2.1 |
| 2002/0171032 | A1 | 11/2002 | Hiromatsu | |
| 2003/0179398 | A1* | 9/2003 | Takano et al. | 358/1.9 |
| 2004/0238722 | A1 | 12/2004 | Hiromatsu | |
| 2005/0174591 | A1* | 8/2005 | Sowinski et al. | 358/1.9 |
| 2006/0170994 | A1* | 8/2006 | MacKinnon et al. | 358/518 |
| 2006/0279754 | A1* | 12/2006 | Minakuti | 358/1.9 |
| 2007/0058181 | A1* | 3/2007 | Hatori | 358/1.9 |
| 2008/0292295 | A1* | 11/2008 | Konno et al. | 396/16 |
| 2009/0021526 | A1* | 1/2009 | Chiang et al. | 345/605 |
| 2009/0073519 | A1* | 3/2009 | Hiromatsu | 358/505 |
| 2009/0231645 | A1* | 9/2009 | Hayashi | 358/520 |
| 2011/0013242 | A1* | 1/2011 | Hagio et al. | 358/520 |
| 2011/0309755 | A1* | 12/2011 | Wirth et al. | 315/151 |

FOREIGN PATENT DOCUMENTS

| | | |
|---|---|---|
| JP | 2003-008911 A | 1/2003 |
| JP | 2008-263510 | 10/2008 |
| JP | 2009-141872 | 6/2009 |

OTHER PUBLICATIONS

English Translation of an Office Action issued on Feb. 19, 2013 for counterpart Japanese Application No. 2009-165123.

* cited by examiner

*Primary Examiner* — Madelein A Nguyen
(74) *Attorney, Agent, or Firm* — Sughrue Mion, PLLC

(57) ABSTRACT

An image reading apparatus includes: a light source that generates light by synthesizing light from different illuminants, and irradiates an irradiated object with the light; a reading unit that reads light irradiated by the light source and reflected by the irradiated object and generates image information on the irradiated object; a correction amount setting unit that acquires from the reading unit the image information generated by using, as the irradiated object, a color sample formed in a color of light emitted by any one of the illuminants generating the light of the light source, and that sets, according to the acquired image information, a correction amount to correct the image information on the irradiated object generated by the reading unit; and a correction unit that corrects the image information on the irradiated object generated by the reading unit, by using the correction amount set by the correction amount setting unit.

17 Claims, 11 Drawing Sheets

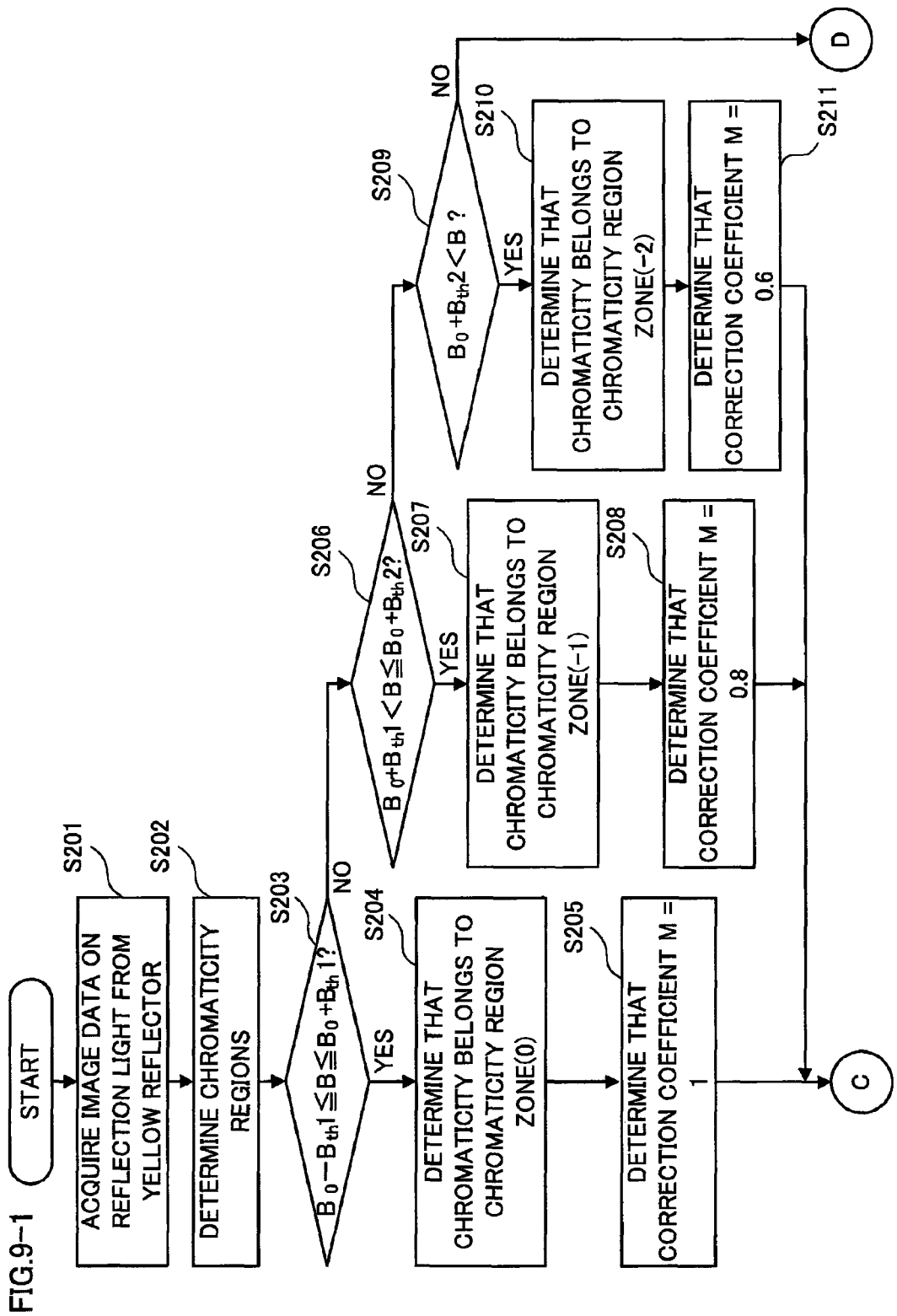

IMAGE READING APPARATUS, IMAGE FORMING APPARATUS, IMAGE INFORMATION CORRECTION METHOD AND COMPUTER READABLE MEDIUM

CROSS REFERENCE TO RELATED APPLICATIONS

This application is based on and claims priority under 35 USC §119 from Japanese Patent Application No. 2009-165123 filed Jul. 13, 2009.

BACKGROUND

1. Technical Field

The present invention relates to an image reading apparatus, an image forming apparatus, an image information correction method and a computer readable medium storing a program.

2. Related Art

An image reading apparatus installed in an image forming apparatus such as a copier, or an image reading apparatus used to input images into a computer has been proposed which employs a white light-emitting diode (hereinafter, "white LED") as a light source to illuminate a surface of an original.

A "white LED" is usually made of a blue LED chip and transparent resin that includes a yellow fluorescent material and is stacked on the blue LED chip. Blue light emitted by the blue LED chip excites the fluorescent material around the chip, thus producing yellow fluorescence. The blue and yellow colors that are complementary to each other are mixed to produce white light. For this reason, chromaticity of light produced by white LEDs varies in yellow and blue directions due to a cause such as manufacturing variations in a fluorescent material dispersion state and the like. This may lead to deterioration in color reading accuracy of an image reading apparatus.

SUMMARY

According to an aspect of the present invention, there is provided an image reading apparatus including: a light source that generates light by synthesizing light from different illuminants, and that irradiates an irradiated object with the light thus generated; a reading unit that reads light irradiated by the light source and reflected by the irradiated object and that generates image information on the irradiated object; a correction amount setting unit that acquires from the reading unit the image information generated by using, as the irradiated object, a color sample formed in a color of light emitted by any one of the illuminants generating the light of the light source, and that sets, according to the image information thus acquired, a correction amount to correct the image information on the irradiated object generated by the reading unit; and a correction unit that corrects the image information on the irradiated object generated by the reading unit, by using the correction amount set by the correction amount setting unit.

BRIEF DESCRIPTION OF THE DRAWINGS

Exemplary embodiment(s) of the present invention will be described in detail based on the following figures, wherein:

FIG. 6-1 is a flowchart showing an example of contents of processing by the color correction circuit to determine the correction coefficient;

FIG. 6-2 is a flowchart showing an example of contents of processing by the color correction circuit to determine the correction coefficient;

FIG. 9-1 is a flowchart showing an example of contents of processing by the color correction circuit to determine the correction coefficient; and FIG. 9-2 is a flowchart showing an example of contents of processing by the color correction circuit to determine the correction coefficient.

DETAILED DESCRIPTION

An exemplary embodiment of the present invention will be described in detail below with reference to the accompanying drawings.

First Exemplary Embodiment

<Description of Image Forming Apparatus>

Figure 1:
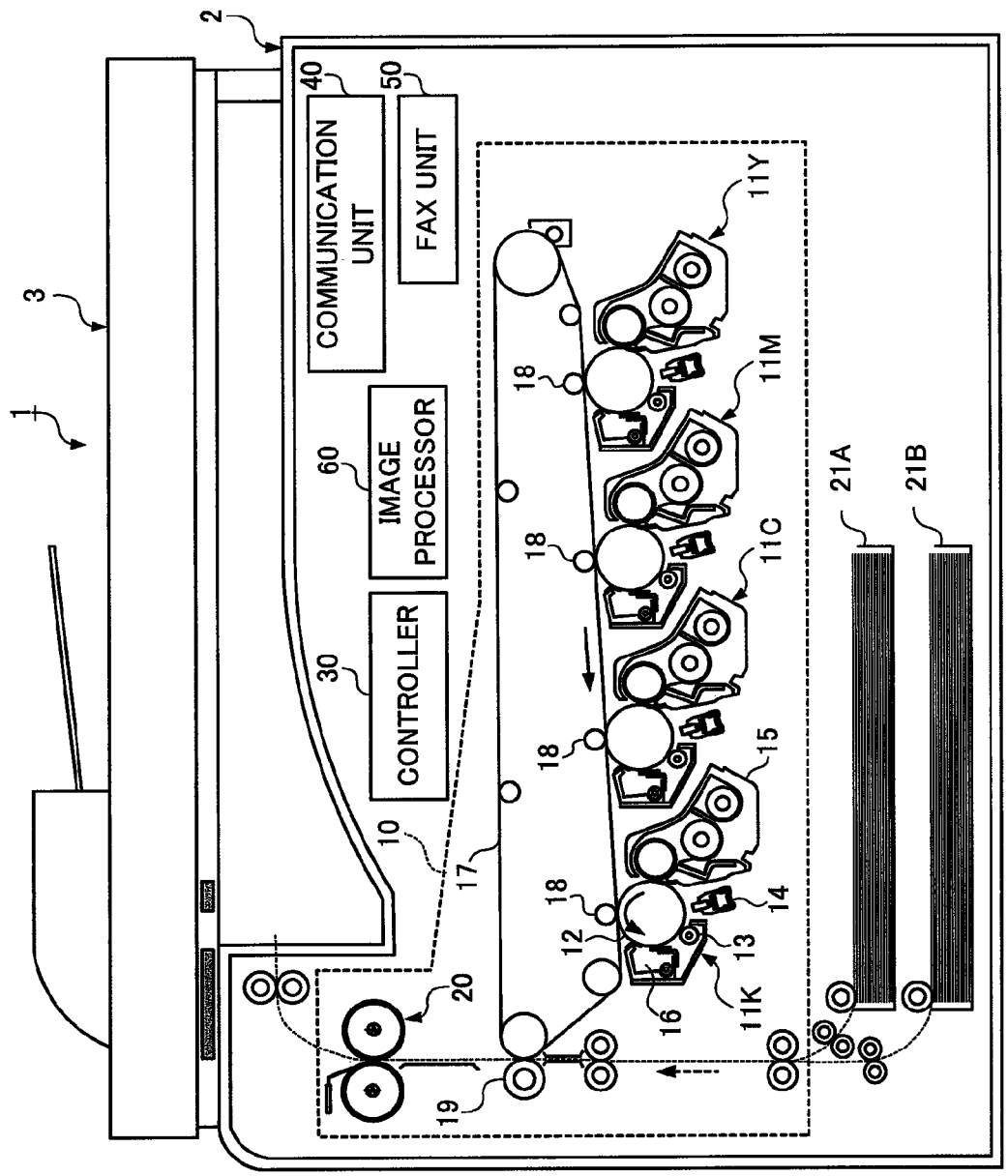
FIG. 1 is a diagram showing the overall configuration of an image forming apparatus including an image reading apparatus according to the first exemplary embodiment.

FIG. 1 is a diagram showing the overall configuration of an image forming apparatus 1 including an image reading apparatus according to the first exemplary embodiment. The image forming apparatus 1 shown in FIG. 1 is a multifunction machine having multiple functions of, for example, copying, printing, facsimile and the like, and is configured of a main unit 2, and an image scanner 3 as an example of an image reading apparatus (image reading function unit).

The main unit 2 includes: an image forming unit 10 as an example of an image forming function unit that forms an image on the basis of image data of each color; a controller 30 that controls operation of the overall image forming apparatus 1; and a communication unit 40 that receives image data from an external device such as a personal computer (PC) via a network such as a local area network (LAN), a wide area network (WAN) or the Internet, for example. Additionally, the main unit 2 includes: a facsimile (fax) unit 50 that transmits and receives images through a public network; and an image processor 60 that performs predetermined image processing on image data transferred from, for example, the image scanner 3 or the communication unit 40.

The image forming unit 10 is a function unit that forms an image in an electrophotographic method, for example, and includes four image forming units 11Y, 11M, 11C and 11K (hereinafter, "image forming units 11") arranged side-by-side. Each of the image forming units 11 is configured of, for example: a photoconductive drum 12 that forms an electrostatic latent image and carries a toner image; a charging device 13 that charges the surface of the photoconductive drum 12 at a predetermined potential; a print head 14 that exposes the photoconductive drum 12 charged by the charging device 13 on the basis of image data; a developing device 15 that develops the electrostatic latent image formed on the photoconductive drum 12; and a cleaner 16 that cleans the surface of the photoconductive drum 12 after transfer.

The image forming unit 10 further includes: an intermediate transfer belt 17 to which the respective color toner images formed on the photoconductive drums 12 of the image forming units 11 are transferred by multilayer transfer; primary transfer rolls 18 that sequentially transfer (primarily transfer), onto the intermediate transfer belt 17, the respective color toner images formed by the image forming units 11; a secondary transfer roll 19 that collectively transfers (secondarily transfers), to a recording medium (sheet), the superposed toner images transferred onto the intermediate transfer belt 17; and a fixing device 20 that fixes the secondarily transferred images on the sheet.

The image forming units 11 of the image forming unit 10 form yellow (Y), magenta (M), cyan (C) and black (K) toner images, respectively, by an electrophotographic process. The respective color toner images formed by the image forming units 11 are electrostatically transferred one after another onto the intermediate transfer belt 17 by the primary transfer rolls 18, thereby to form composite toner images in which the respective color toner images are superposed with each other. The composite toner images on the intermediate transfer belt 17 are transported to a region where the secondary transfer roll 19 is arranged, along with the movement of the intermediate transfer belt 17 (in the direction indicated by the solid arrow). Then, the composite toner images are electrostatically transferred at a time onto the sheet supplied from a sheet holding unit 21A or 21B (in the direction indicated by the broken arrow). After that, the composite toner images having been electrostatically transferred onto the sheet are fixed on the sheet by being subjected to fixing processing by the fixing device 20.

Note that, instead of the electrophotographic method, any one of various image forming methods for forming an image on a sheet, such as an ink-jet method, may be employed for the image forming unit 10.

<Description of Image Scanner>

Next, a description will be given with regard to the image scanner 3.

The image scanner 3 reads an image on an original (irradiated object), generates image data (image information), and transmits the generated image data to the main unit 2.

Figure 2:
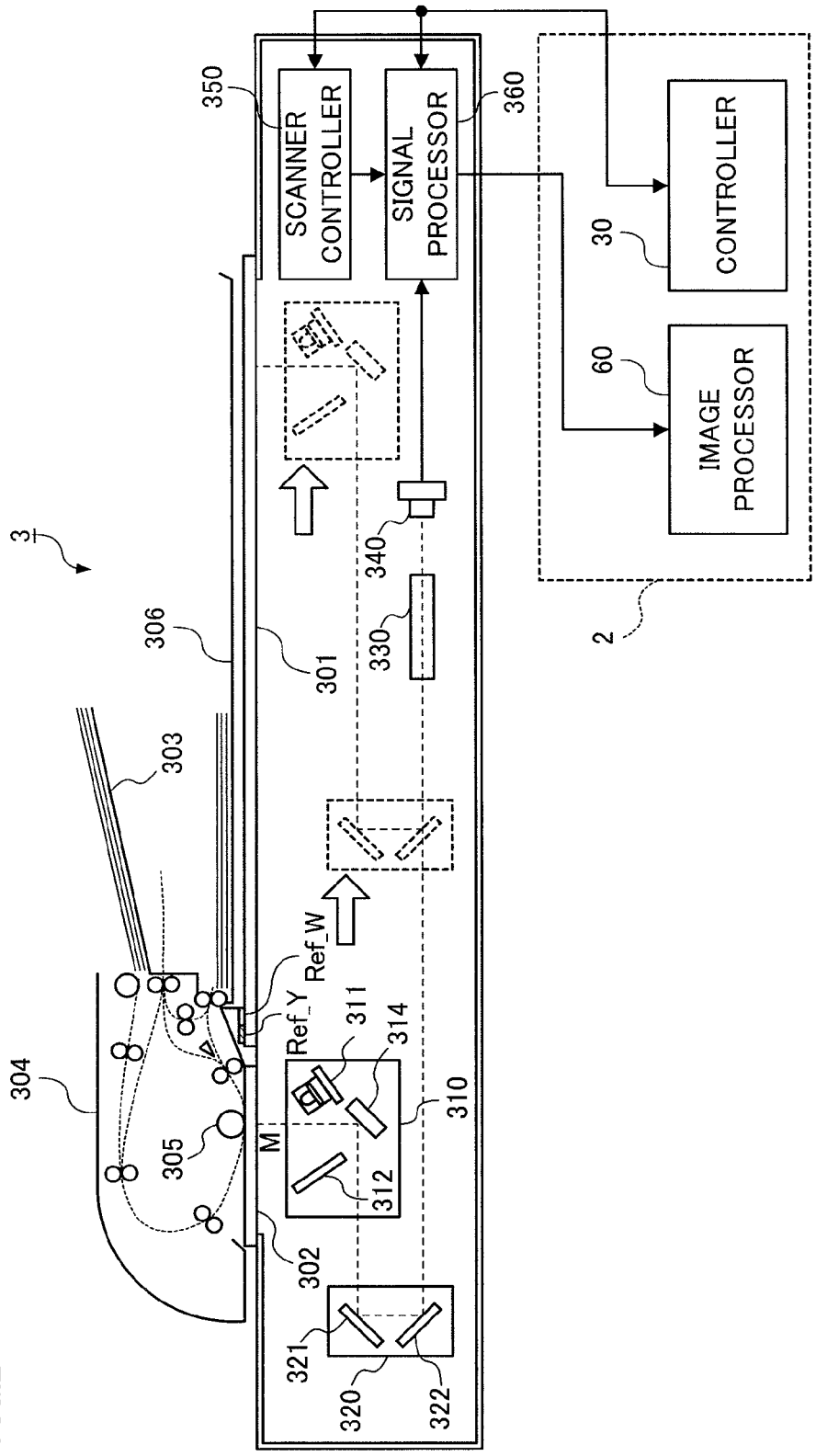
FIG. 2 is a diagram illustrating a configuration of the image scanner.

FIG. 2 is a diagram illustrating a configuration of the image scanner 3. As shown in FIG. 2, the image scanner 3 includes: a first platen glass 301 on which the original is placed in a stationary state; and a second platen glass 302 that forms a light aperture (reading point M) for reading the original being transported. Further, the image scanner 3 includes: an original tray 303 on which multiple originals are placed; an original transport unit 304 that transports the original placed on the original tray 303 so that one or both surfaces of the original passes through the reading point M of the second platen glass 302; a platen roll 305 that brings the original into close contact with the second platen glass 302 at the reading point M; and a stacking tray 306 that stacks the read originals.

Furthermore, the image scanner 3 includes: a full rate carriage 310 that reads an image while being in a stationary state at the reading point M of the second platen glass 302 or while scanning throughout the first platen glass 301; and a half rate carriage 320 that guides light obtained from the full rate carriage 310 to a CCD image sensor 340 (to be described later).

The full rate carriage 310 includes: a lighting unit 311 formed of an array of multiple white light-emitting diodes (hereinafter, "white LEDs") as an example of a light source that irradiates the original with light; a diffuse-reflection member 312 that reflects the light emitted from the lighting unit 311 toward the original surface while diffusing the light; and a first mirror 314 that reflects the reflected light obtained from the original surface toward the half rate carriage 320.

The half rate carriage 320 includes a second mirror 321 and a third mirror 322 that guide the light obtained from the full rate carriage 310 to the CCD image sensor 340.

Still furthermore, the image scanner 3 includes: a focusing lens 330 that optically reduces the size of an optical image obtained from the half rate carriage 320; and the charge coupled device (CCD) image sensor 340 as an example of an image signal generating unit that generates R (red), G (green) and B (blue) color signals (image signals) by photoelectrically converting the optical image formed by the focusing lens 330.

Still furthermore, the image scanner 3 includes: a scanner controller 350 that controls operation of the image scanner 3; and a signal processor 360 as an example of a signal processing unit that processes the image signals of each colors (R, G, B) provided from the CCD image sensor 340, and thereby generates the image data. The scanner controller 350 and the signal processor 360 are respectively connected by signal lines to the controller 30 and the image processor 60 of the main unit 2, thereby to mutually transmit and receive control signals, read image data or the like.

Additionally, a white reflector Ref_W and a yellow reflector Ref_Y are arranged at a position located on the most upstream side in the scanning direction of the full rate carriage 310 of the first platen glass 301 and located outside of a read range for an original. The white reflector Ref_W is provided so as to be in surface contact with the upper surface of the first platen glass 301 along the fast scan direction, and has a white reference surface that is used for shading-correction processing (to be described later) and on which reflectance is uniform throughout the whole area in the fast scan direction. The yellow reflector Ref_Y is an example of a color sample, is provided so as to be in surface contact with the upper surface of the first platen glass 301 along the fast scan direction, and has a yellow reference surface that is used for determining later-described chromaticity of the white LEDs and on which reflectance is uniform throughout the whole area in the fast scan direction.

In the image scanner 3 according to the first exemplary embodiment, to read the original placed on the first platen glass 301, the controller 30 of the main unit 2 instructs the scanner controller 350 to read the original placed on the first platen glass 301, on the basis of an operation input by a user from an operation panel (not shown in the figure) of the main unit 2.

Upon receipt of the command to read the original placed on the first platen glass 301 from the controller 30 of the main unit 2, the scanner controller 350 moves the full rate carriage 310 and the half rate carriage 320 at a ratio of 2 to 1 in the scanning direction (in the direction indicated by the arrow in FIG. 2), as shown with the broken lines in FIG. 2. Further, the lighting unit 311 of the full rate carriage 310 emits light to irradiate the original surface. Thereby, the reflected light from the original is guided through the first mirror 314, the second mirror 321 and the third mirror 322 to the focusing lens 330. The light guided to the focusing lens 330 is focused to form an image on a light receiving surface of the CCD image sensor 340. The CCD image sensor 340 is configured of a set of three arrays of one-dimensional line sensors for R, G and B colors, and performs simultaneous processing on each line for each color. Then, reading in the line direction is executed by scanning of the entire original size, thereby to read a page of the original.

The image signals (R, G, B) obtained by the CCD image sensor 340 are transferred to the signal processor 360.

On the other hand, in the image scanner 3, to read the original placed on the original tray 303, the controller 30 of the main unit 2 instructs the scanner controller 350 to read the original placed on the original tray 303, on the basis of an operation input by a user from the operation panel (not shown in the figure) of the main unit 2.

Upon receipt of the command to read the original placed on the original tray 303 from the controller 30 of the main unit 2, the scanner controller 350 causes the original transport unit 304 to transport the original placed on the original tray 303 to the reading point M of the second platen glass 302. At this time, the full rate carriage 310 and the half rate carriage 320 are set in a stopped state at the solid line positions shown in FIG. 2. Then, the lighting unit 311 of the full rate carriage 310 emits light to irradiate the original surface. Thereby, the reflected light from the original being in close contact with the second platen glass 302 by the platen roll 305 is guided through the first mirror 314, the second mirror 321 and the third mirror 322 to the focusing lens 330. The light guided to the focusing lens 330 is focused to form an image on the light receiving surface of the CCD image sensor 340. The CCD image sensor 340 performs simultaneous processing on each line for each of R, G and B colors. Then, the overall original is caused to pass through the reading point M of the second platen glass 302, thereby to read a page of the original.

The image signals (R, G, B) obtained by the CCD image sensor 340 are transferred to the signal processor 360.

Note that various members arranged on a light path from the white LEDs to the CCD image sensor 340, function units configuring the signal processor 360, and other configuring units, as necessary, function as a reading unit that reads light irradiated by the light source and reflected by the irradiated object and that generates image information on the irradiated object.

<Description of Signal Processor>

Next, the signal processor 360 that processes the image signals of each color (R, G, B) generated by the CCD image sensor 340 will be described.

Figure 3:
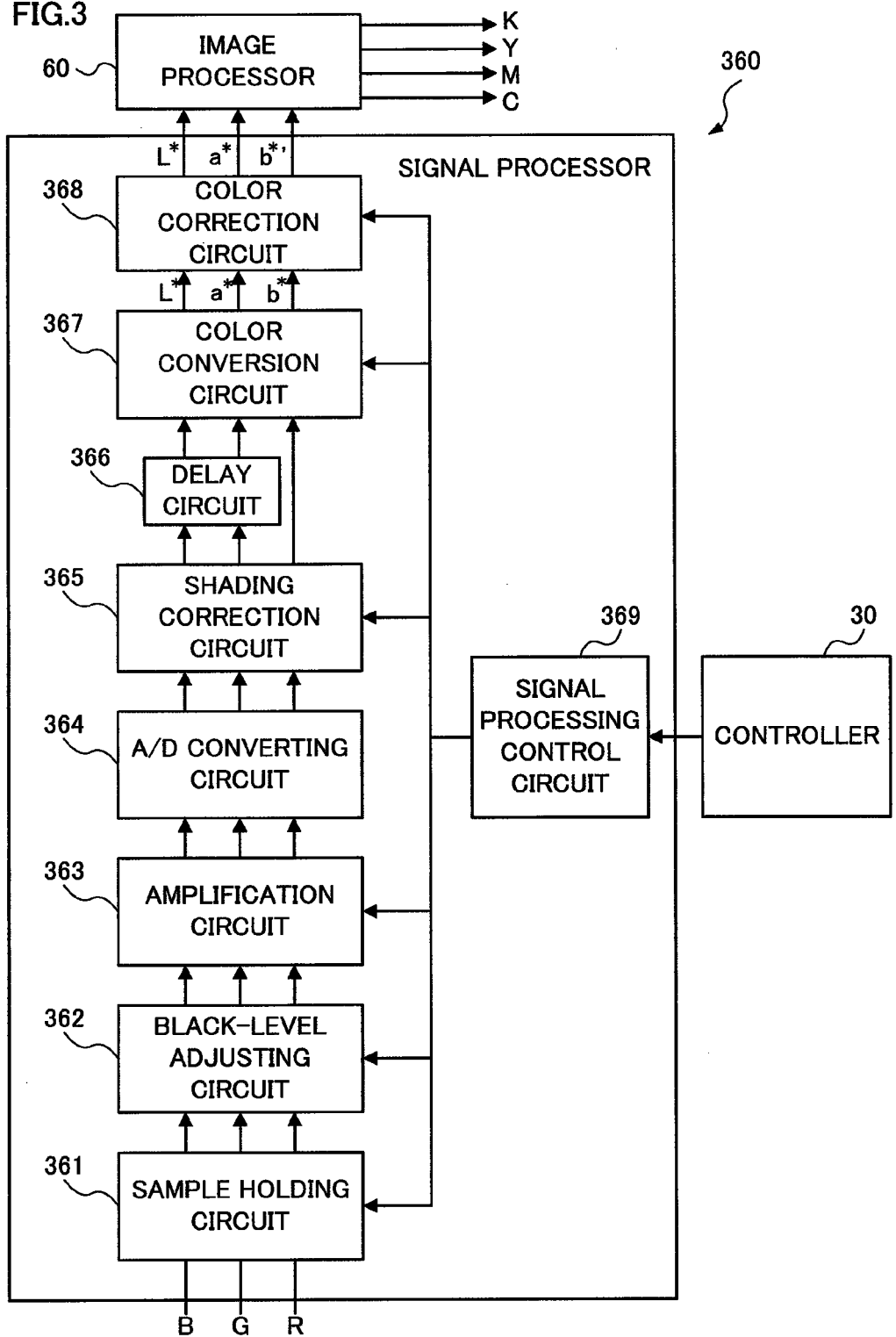
FIG. 3 is a block diagram illustrating a configuration of the signal processor.

FIG. 3 is a block diagram illustrating a configuration of the signal processor 360.

As shown in FIG. 3, the signal processor 360 includes a sample holding circuit 361, a black-level adjusting circuit 362, an amplification circuit 363, an A/D converting circuit 364, and a shading correction circuit 365.

The sample holding circuit 361 performs a sampling-holding operation. Specifically, the sample holding circuit 361 samples analogue image signals (R, G, B) of each color transferred from the CCD image sensor 340, and holds the signals for a predetermined time period.

The black-level adjusting circuit 362 adjusts the analogue image signals (R, G, B) subjected to the sampling-holding operation by the sample holding circuit 361 in such a manner that a black level outputted by the image scanner 3 matches with a black level of an output corresponding to black of an original (hereinafter, "read original") having been read.

The amplification circuit 363 amplifies the analogue image signals (R, G, B) obtained by the black-level adjustment.

The A/D converting circuit 364 performs A/D conversion on the analogue image signals (R, G, B) amplified by the amplification circuit 363 to obtain image data (R, G, B), which are digital data.

The shading correction circuit 365 performs shading-correction processing. Specifically, the shading correction circuit 365 corrects reading unevenness in the image data (R, G, B) converted by the A/D converting circuit 364, which unevenness is attributable to the lighting unit 311 and the CCD image sensor 340. The shading correction circuit 365 also adjusts the image data (R, G, B) in such a manner that a white level outputted from the image scanner 3 matches with a white level of the read original.

Furthermore, the signal processor 360 includes a delay circuit 366, a color conversion circuit 367, a color correction circuit 368, and a signal processing control circuit 369.

The delay circuit 366 corrects a time difference of reading image data pieces, by using the image data R as a reference. The difference occurs due to position offsets in a slow scan direction among the one-dimensional line sensors for R, G and B, which constitute the CCD image sensor 340.

The color conversion circuit 367 converts the image data (R, G, B) into image data (L*, a*, b*) in an L*a*b* color space, which is a luminance and color-difference color space.

The color correction circuit 368 corrects the image data (L*, a*, b*) in accordance with chromaticity of the white LEDs constituting the lighting unit 311. The image data (L*, a*, b*) corrected by the color correction circuit 368 is transferred to the image processor 60 included in the main unit 2. Then, the image data (L*, a*, b*) are subjected to color conversion processing and the like to obtain image data (C, M, Y, K) in an output color space. Note that the image processor 60, which performs the color conversion processing and the like to obtain the image data (C, M, Y, K) in the output color space, may be provided inside of the image scanner 3.

The signal processing control circuit 369 controls operations respectively of the sample holding circuit 361, the black-level adjusting circuit 362, the amplification circuit 363, the shading correction circuit 365, the delay circuit 366, the color conversion circuit 367 and the color correction circuit 368, under the control of the controller 30 of the main unit 2.

In the signal processor 360, three analogue image signals (R, G, B) transferred from the CCD image sensor 340 are sampled by the sample holding circuit 361, then have the black level of the analogue image signals adjusted by the black-level adjusting circuit 362, and, furthermore, are amplified to be in predetermined signal levels by the amplification circuit 363. The A/D converting circuit 364 performs A/D conversion on the amplified analogue image signals (R, G, B) to generate digital image data (R, G, B). The shading correction circuit 365 corrects the image data (R, G, B) based on image data obtained by reading the white reflector Ref_W in such a manner that the image data (R, G, B) corresponds to variations in sensitivity of the one-dimensional line sensors constituting the CCD image sensor 340 and a light quantity distribution characteristic of an optical system.

Then, after the delay circuit 366 corrects the image data (R, G, B) in terms of position offsets in the slow scan direction, the image data (R, G, B) is converted by the color conversion circuit 367 into image data (L*, a*, b*) in the L*a*b* color space. Furthermore, the color correction circuit 368 corrects the image data (L*, a*, b*) in accordance with the chromaticity of the white LEDs constituting the lighting unit 311. The image data (L*, a*, b*) corrected by the color correction circuit 368 are then transferred to the image processor 60 included in the main unit 2.

<Description of Color Correction Circuit 368>

Next, the color correction circuit 368 included in the signal processor 360 will be described.

In the image scanner 3 of the first exemplary embodiment, when a power supply of the image forming apparatus 1 is turned on, the scanner controller 350 first moves the full rate carriage 310 to a position to read the yellow reflector Ref_Y, and keeps the full rate carriage 310 there. Then, the scanner controller 350 controls the lighting unit 311 to cause the white LEDs, which are the light source, to emit light. Thereby, light reflected from the yellow reflector Ref_Y is guided to the CCD image sensor 340, whereby read image signals (R, G, B), obtained by the CCD image sensor 340, on the yellow reflector Ref_Y are transferred to the signal processor 360.

In the signal processor 360, the above mentioned processing is sequentially performed, and then the image data (L*, a*, b*) on the yellow reflector Ref_Y are transmitted to the color correction circuit 368.

The color correction circuit 368 acquires the image data (L*, a*, b*) on the yellow reflector Ref_Y, and determines chromaticity of the white LEDs on the basis of the acquired image data (L*, a*, b*). Then, the color correction circuit 368 determines, on the basis of a result of the determination, whether it is necessary to correct the image data. Then, if it is necessary to correct the image data, the color correction circuit 368 determines a correction coefficient to be used for the correction of the image data, and stores therein the determined correction coefficient.

Thereby, upon acquiring image data on the read original, the signal processor 360 performs correction processing on the image data of a pixel that requires correction, by use of the stored correction coefficient.

Figure 4:
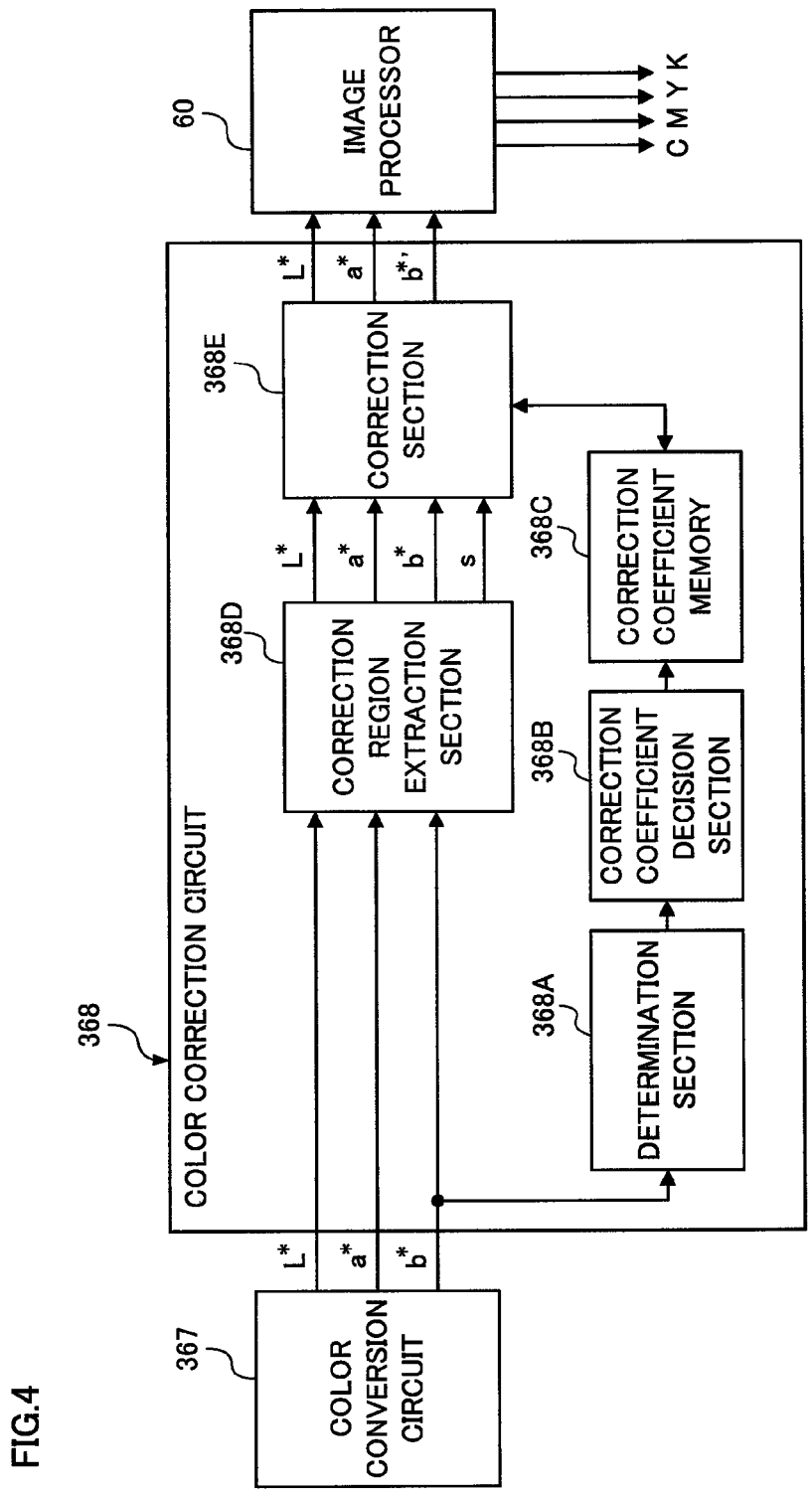
FIG. 4 is a block diagram illustrating a configuration of the color correction circuit.

FIG. 4 is a block diagram illustrating a configuration of the color correction circuit 368.

As shown in FIG. 4, the color correction circuit 368 of the first exemplary embodiment includes a determination section 368A, a correction coefficient decision section 368B, a correction coefficient memory 368C, a correction region extraction section 368D, and a correction section 368E.

<Description of Determination of Chromaticity of White LEDs>

The determination section 368A acquires a b* component in the image data (L*, a*, b*) on the yellow reflector Ref_Y, and then determines the chromaticity of the white LEDs on the basis of a magnitude of the b* component.

Each of the white LEDs used as the light source in the lighting unit 311 of the first exemplary embodiment is formed by laminating a blue LED chip and transparent resin including a yellow fluorescent material. While the blue LED chip is provided as an example of a first illuminant, the transparent resin including a yellow fluorescent material is provided as an example of a second illuminant. Blue light emitted by the blue LED chip as an example of light of a first color excites the yellow fluorescent material around the chip, thus producing yellow fluorescence as an example of light of a second color. Thereby, the blue and yellow that are complementary to each other are mixed (synthesized) to produce white light. For this reason, chromaticity of light produced by white LEDs may vary in a yellow or blue direction in a case, for example, where characteristics, additive amounts, dispersion states and the like of a yellow fluorescent material are varied during the manufacture.

Figure 5:
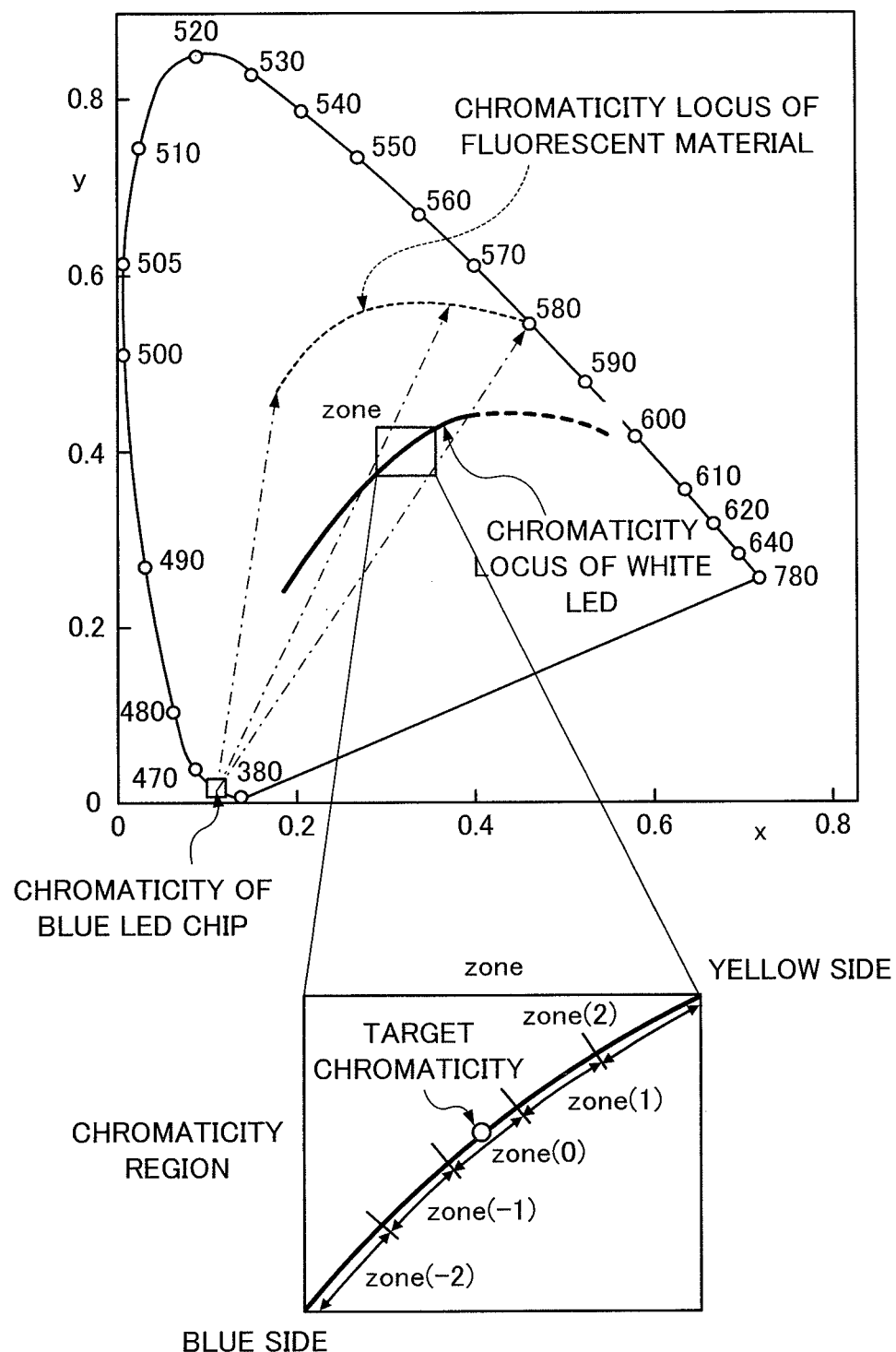
FIG. 5 is a diagram explaining variations in chromaticity of white LEDs on an x-y chromaticity diagram.

FIG. 5 is a diagram explaining variations in chromaticity of white LEDs on an x-y chromaticity diagram.

As shown in FIG. 5, in the white LEDs, chromaticity (chromaticity on "chromaticity locus of white LEDs" in FIG. 5) on lines (dashed dotted lines in FIG. 5) is realized. Each of the lines connects chromaticity of a blue LED chip and chromaticity (chromaticity on "chromaticity locus of fluorescent material" in FIG. 5) of the yellow fluorescent material. Specifically, depending, for example, on characteristics, additive amounts, dispersion states and the like of the yellow fluorescent material, the chromaticity in the white LEDs mounted in the lighting unit 311 vary within a specific region ("zone" in FIG. 5) on the chromaticity locus of the white LEDs.

Therefore, in the first exemplary embodiment, chromaticity of the white LEDs, or the region (zone) on the chromaticity locus of the white LEDs, is divided into multiple chromaticity regions (zone(n) where n=integer) with target chromaticity (target value of chromaticity) using as a center. As shown in FIG. 5, for example, the region (zone) on the chromaticity locus of the white LEDs is divided into five chromaticity regions of: a chromaticity region zone(0) set within a predetermined chromaticity range with a target chromaticity point at the center; a chromaticity region zone(1) closer to the yellow side than the chromaticity region zone(0); a chromaticity region zone(2) much closer to the yellow side; a chromaticity region zone(−1) closer to the blue side than the chromaticity region zone(0); and a chromaticity region zone (−2) much closer to the blue side.

The determination section 368A in the first exemplary embodiment determines into which one (zone(n)) of the above described chromaticity regions chromaticity of light generated by the white LEDs falls For this purpose, the following operations are made in the image scanner 3, as described above. Specifically, when a power supply of the image forming apparatus 1 is turned on, the CCD image sensor 340 reads the reflection light of yellow, which is an example of the light of the second color, from the yellow reflector Ref_Y. The signal processor 360 then processes image data, from the CCD image sensor 340, on the yellow reflector Ref_Y and generates the image data (L*, a*, b*) in the L*a*b* color space. Then, on the basis of the image data (L*, a*, b*) on the yellow reflector Ref_Y, the color correction circuit 368 determines into which one (zone(n)) of the above described chromaticity regions the chromaticity of the white LEDs falls.

As the b* component in the image data (L*, a*, b*) in the L*a*b* color space is larger in a plus direction, the yellow (Y) color exhibits higher chromaticity. Whereas, as the b* component is larger in a minus direction, the blue (B) color exhibits higher chromaticity. For this reason, checking the b* component in the image data (L*, a*, b*) allows the determination of the chromaticity of the white LEDs, in terms of whether the yellow (Y) or the blue (B) is stronger. Because of this, the determination section 368A in the first exemplary embodiment uses the b* component in the image data (L*, a*, b*) in the L*a*b* color space to determine to which one (zone(n)) of the above described chromaticity regions the chromaticity of the white LEDs belongs.

Each one (zone(n)) of the chromaticity regions here is set with respect to the b* component in the following manner, for example.

Specifically, a value $b_0^*$ of the b* component for the target chromaticity of the white LEDs is previously found. Furthermore, a first threshold $b_{th}1$ and a second threshold $b_{th}2$ are previously set, where $b_{th}1 < b_{th}2$. Then, a range of plus and minus the first threshold $b_{th}1$ from the value $b_0^*$ of the b* component for the target chromaticity, that is, $b_0^* - b_{th}1 \leq b^* \leq b_0^* + b_{th}1$, is set as the chromaticity region zone(0).

Additionally, a range in which $b_0^* + b_{th}1 < b^* \leq b_0^* + b_{th}2$ is set as the chromaticity region zone(−1). Furthermore, a range in which $b_0^* + b_{th}2 < b^*$ is set as the chromaticity region zone (−2).

Additionally, a range in which $b_0^* - b_{th}2 \leq b^* < b_0^* - b_{th}1$ is set as the chromaticity region zone(1). Furthermore, a range in which $b^* < b_0^* - b_{th}2$ is set as the chromaticity region zone (2).

In this case, the use of the reflection light from the yellow reflector Ref_Y when the determination section 368A determines the chromaticity of the white LEDs increases an accuracy of the determination made by the determination section 368A.

First, the signal processor 360 sets amplification rates to be used by the amplification circuit 363 so that each component value of analogue image signals (R, G, B) of reflection light from the white reflector Ref_W may become a predetermined target value. For this reason, an amplification rate for the B component value is set larger than amplification rates for the R component value and the G component value if the reflection light from the white reflector Ref_W has the B component value smaller than the R component value and the G component value because the chromaticity of the white LEDs is shifted in the yellow direction. If the reflection light from the yellow reflector Ref_Y is read under this condition, light of the B component is absorbed through the yellow reference surface included in the yellow reflector Ref_Y, and the light of the B component, which is supposed to be small, is amplified to a large extent. For this reason, a value for a Y component (an R component+a G component) of the reflection light from the yellow reflector Ref_Y is measured as a relatively small value. Thereby, the use of the yellow reflector Ref_Y decreases, in the entire reflection light, a relative rate of the yellow (Y) color component produced by mixing the R and G components.

Thus, the B component is filtered with the yellow reference surface of the yellow reflector Ref_Y reflecting the light generated by the white LEDs, thereby decreasing the relative rate of the yellow (Y) color component in the entire reflection light. Accordingly, an accuracy of detecting the yellow (Y) color component included in the light generated by the white LEDs is enhanced, thereby improving an accuracy of determining the chromaticity of the white LEDs.

Note that, if a gradation of each color component is expressed with 256 scales, for example, the yellow reference surface provided to the yellow reflector Ref_Y may be set to pure yellow expressed by (R, G, B)=(0, 0, 255), for example, or a color approximate to the pure yellow. This is for the enhancement of the efficiency in absorbing the B component light.

<Description of Determination of Correction Coefficient>

Subsequently, the correction coefficient decision section 368B determines a correction coefficient by use of the chromaticity region (zone(n)) that is determined by the determination section 368A as one to which the chromaticity of the white LEDs belongs. Here, the correction coefficient is an example of a correction amount to correct the b* component in the image data (L*, a*, b*) in the L*a*b* space obtained by the color conversion by the color conversion circuit 367.

For example, if the chromaticity of the white LEDs belongs to the chromaticity region zone(0), the correction coefficient decision section 368B judges that the image data (L*, a*, b*) generated by reading the original has a small variation (shift amount) in color. Thereby, the correction coefficient decision section 368B determines not to make any correction.

Meanwhile, if the chromaticity of the white LEDs belongs to the chromaticity region zone(1) closer to the yellow side or the chromaticity region zone(2) much closer to the yellow side, the correction coefficient decision section 368B judges that the image data (L*, a*, b*) generated by reading the original has a shift (shift amount) (the image data (L*, a*, b*) is shifted) toward the blue side. Thereby, the correction coefficient decision section 368B determines to make a correction of increasing the b* component in the image data (L*, a*, b*).

On the other hand, if the chromaticity of the white LEDs belongs to the chromaticity region zone(−1) closer to the blue side or the chromaticity region zone(−2) much closer to the blue side, the correction coefficient decision section 368B judges that the image data (L*, a*, b*) generated by reading the original has a shift (shift amount) (the image data (L*, a*, b*) is shifted) toward the yellow side. Thereby, the correction coefficient decision section 368B determines to make a correction of decreasing the b* component in the image data (L*, a*, b*).

Specifically, suppose that a correction function such as the following Equation (1) is set in the correction section 368E that corrects the image data (L*, a*, b*) generated by reading the original:

$$b^{*\prime} = (b^* - TH) \times M + TH \tag{1}$$

where $b^{*\prime}$ is a b* component after the correction; TH is a constant, to which a chromaticity difference in the chromaticity region zone(0), for example, between the target chromaticity and a threshold in the yellow side is set; and M is the correction coefficient determined by the correction coefficient decision section 368B.

For example, when the determination section 368A determines that the chromaticity of the white LEDs belongs to the chromaticity region zone(0), the correction coefficient decision section 368B determines that the correction coefficient M=1. When the determination section 368A determines that the chromaticity of the white LEDs belongs to the chromaticity region zone(1), the correction coefficient decision section 368B determines that the correction coefficient M=1.2. When the determination section 368A determines that the chromaticity of the white LEDs belongs to the chromaticity region zone(2), the correction coefficient decision section 368B determines that the correction coefficient M=1.4.

On the other hand, when the determination section 368A determines that the chromaticity of the white LEDs belongs to the chromaticity region zone(−1), the correction coefficient decision section 368B determines that the correction coefficient M=0.8. When the determination section 368A determines that the chromaticity of the white LEDs belongs to the chromaticity region zone(−2), the correction coefficient decision section 368B determines that the correction coefficient M=0.6.

Then, the correction coefficient decision section 368B stores the determined correction coefficients M in the correction coefficient memory 368C.

Thus, the determination section 368A and the correction coefficient decision section 368B function as a correction amount setting unit that sets the correction amount.

<Description of Contents of Correction Coefficient Determination Processing>

A description will be given of contents of processing by the color correction circuit 368 to determine the correction coefficient.

Figures 1, 6:
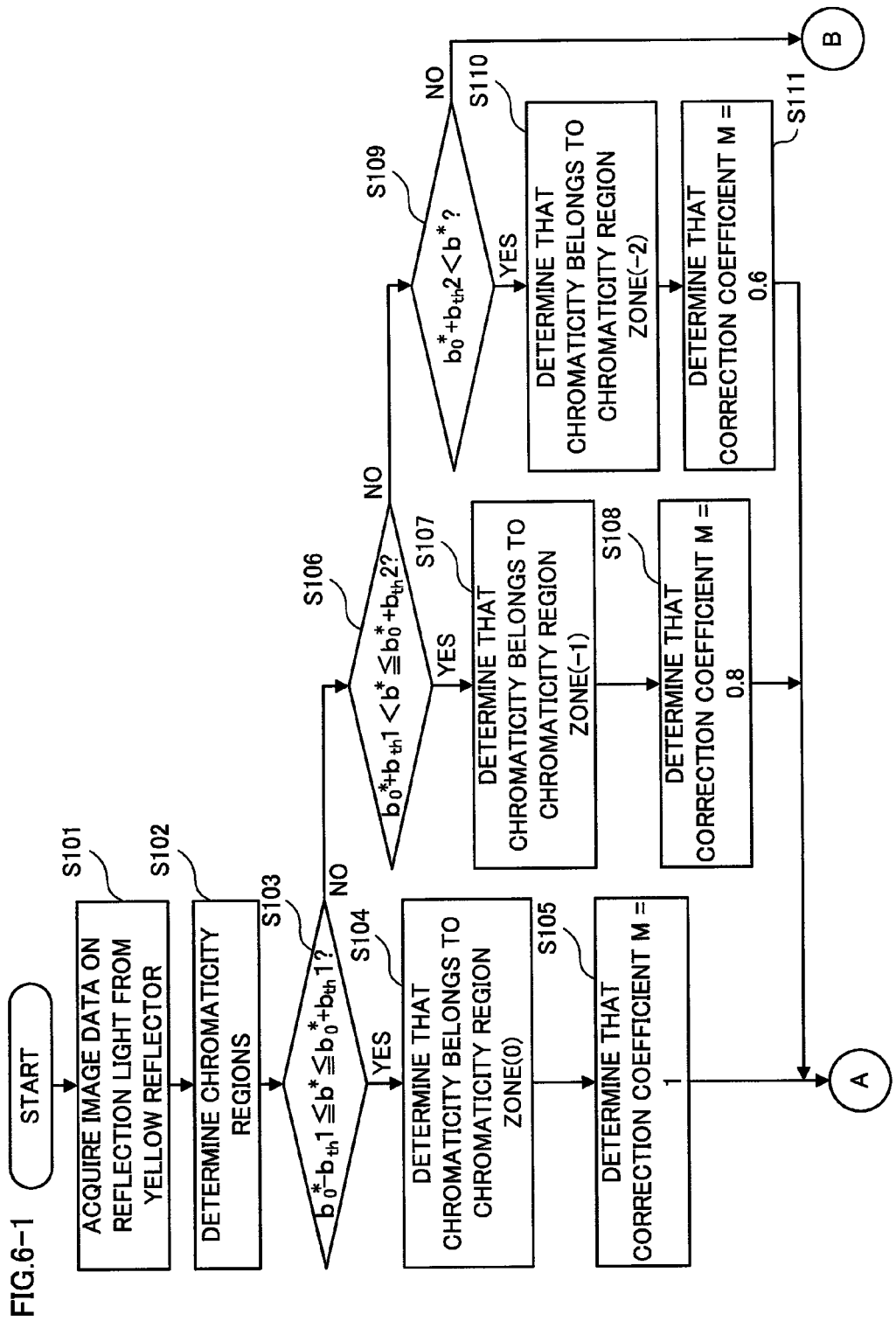
Figures 2, 6:
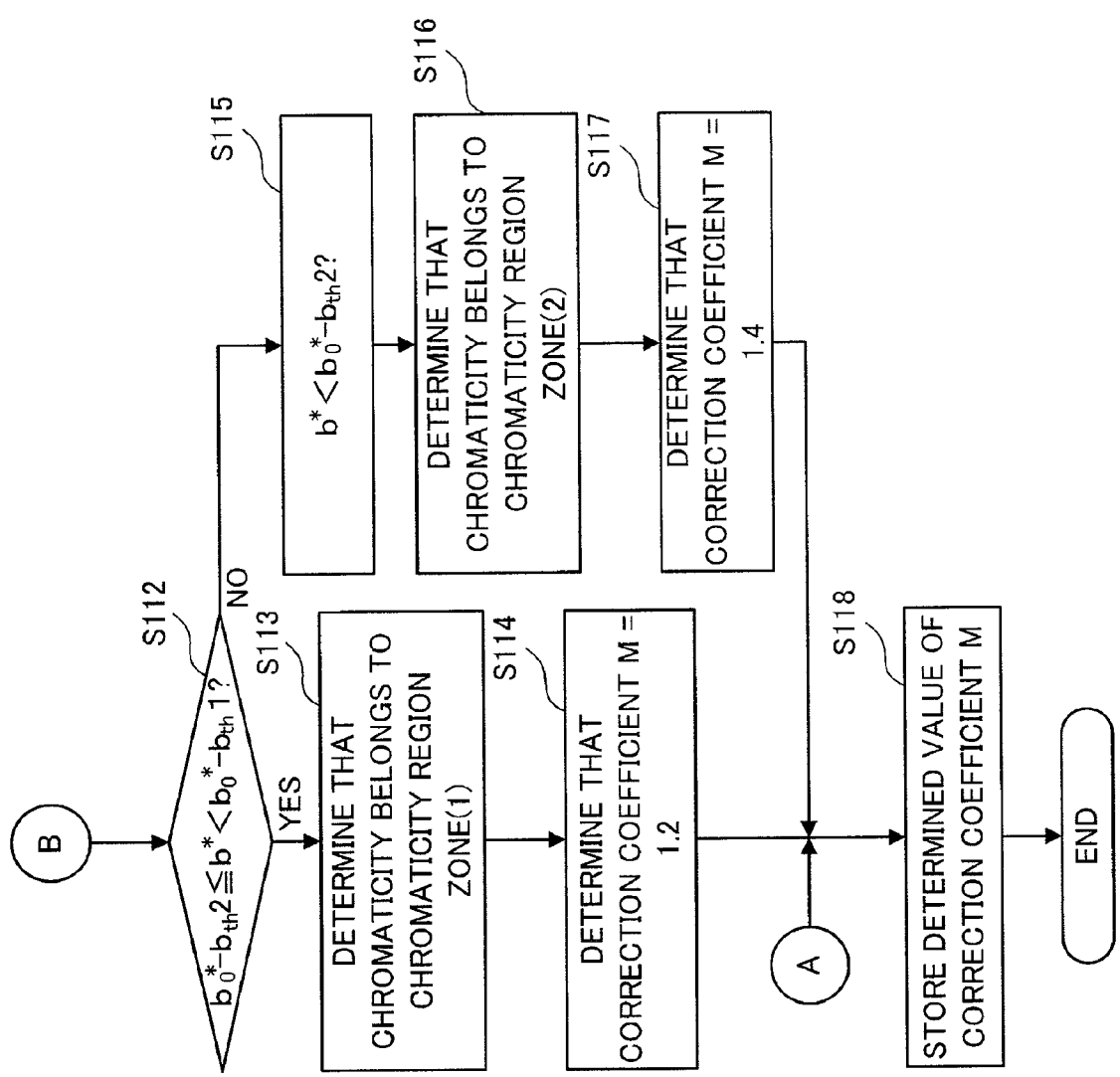

FIGS. 6-1 and 6-2 are flowcharts showing an example of contents of processing by the color correction circuit 368 to determine the correction coefficient.

First, as shown in FIG. 6-1, the determination section 368A of the color correction circuit 368 acquires, from the color conversion circuit 367, the image data (L*, a*, b*) on the reflection light from the yellow reflector Ref_Y obtained by the color conversion into the L*a*b* color space (Step 101). Then, the determination section 368A extracts the b* component of the image data (L*, a*, b*), and determines to which one (zone(n)) of the above described chromaticity regions the b* component belongs (Step 102).

If the determination result shows that a value of the b* component satisfies $b_0^* - b_{th}1 \cdot b^* \cdot b_0^* + b_{th}1$ (Yes in Step 103), the determination section 368A determines that the chromaticity of the white LEDs belongs to the chromaticity region zone(0) (Step 104).

By acquiring, from the determination section 368A, the determination result that the chromaticity of the white LEDs belongs to the chromaticity region zone(0), the correction coefficient decision section 368B of the color correction circuit 368 determines that the correction coefficient M=1 (Step 105).

Meanwhile, if the value of the b* component satisfies $b_0^*+b_{th}1<b^*\cdot b_0^*+b_{th}2$ (No in Step 103 and Yes in Step 106), the determination section 368A determines that the chromaticity of the white LEDs belongs to the chromaticity region zone(−1) (Step 107).

By acquiring, from the determination section 368A, the determination result that the chromaticity of the white LEDs belongs to the chromaticity region zone(−1), the correction coefficient decision section 368B determines that the correction coefficient M=0.8 (Step 108).

Meanwhile, if the value of the b* component satisfies $b_0^*+b_{th}2<b^*$ (No in Step 106 and Yes in Step 109), the determination section 368A determines that the chromaticity of the white LEDs belongs to the chromaticity region zone(−2) (Step 110).

By acquiring, from the determination section 368A, the determination result that the chromaticity of the white LEDs belongs to the chromaticity region zone(−2), the correction coefficient decision section 368B determines that the correction coefficient M=0.6 (Step 111).

Subsequently, as shown in FIG. 6-2, if the value of the b* component satisfies $b_0^*-b_{th}2\cdot b^*<b_0^*-b_{th}1$ (No in Step 109 and Yes in Step 112), the determination section 368A determines that the chromaticity of the white LEDs belongs to the chromaticity region zone(1) (Step 113).

By acquiring, from the determination section 368A, the determination result that the chromaticity of the white LEDs belongs to the chromaticity region zone(1), the correction coefficient decision section 368B determines that the correction coefficient M=1.2 (Step 114).

Meanwhile, if the value of the b* component satisfies $b^*<b_0^*-b_{th}2$ (which is Step 115, as a consequence of No in Step 109 and No in Step 112), the determination section 368A determines that the chromaticity of the white LEDs belongs to the chromaticity region zone(2) (Step 116).

By acquiring, from the determination section 368A, the determination result that the chromaticity of the white LEDs belongs to the chromaticity region zone(2), the correction coefficient decision section 368B determines that the correction coefficient M=1.4 (Step 117).

Then, the correction coefficient decision section 368B stores the determined value of the correction coefficient M in the correction coefficient memory 368C (Step 118), which ends the processing of determining the correction coefficient.

<Description of Extraction of Correction Target Color Region>

Subsequently, the correction region extraction section 368D extracts, from the image data (L*, a*, b*) generated by reading the original, a pixel to be subjected to correction according to a chromaticity variation of the white LEDs.

Specifically, the correction region extraction section 368D determines in advance a color region of yellow that is susceptible to the chromaticity variation of the white LEDs. For example, the correction region extraction section 368D determines in advance a threshold TH on the value of the b* component in the L*a*b* color space, as a threshold to be used to define a color region range of yellow that is susceptible to the chromaticity variation of the white LEDs. Then, a color region (correction target color region), in the L*a*b* color space, satisfying b*>threshold TH is set in the correction region extraction section 368D.

Thereafter, the correction region extraction section 368D extracts, from the image data (L*, a*, b*) generated by reading the original, a pixel located in the correction target color region in the L*a*b* color space. Then, the correction region extraction section 368D adds, to the image data (L*, a*, b*) of the extracted pixel, attribute information s indicating that the pixel is a correction target (is a correction target pixel), and outputs the image data (L*, a*, b*) to the correction section 368E.

<Description of Correction Processing on Image Data>

The correction section 368E acquires the correction coefficient M from the correction coefficient memory 368C. Then, the correction section 368E performs correction processing, for example with the above mentioned Equation (1), on the b* component in the image data (L*, a*, b*) of the pixel to which the correction region extraction section 368D adds the attribute information s indicating that the pixel is a correction target pixel. With this correction, image data (L*, a*, b*') is generated in which a color shift attributable to the chromaticity variation of the white LEDs is corrected.

The correction section 368E transfers the generated image data (L*, a*, b*') to the image processor 60 included in the main unit 2.

The correction region extraction section 368D and the correction section 368E function as a correction unit that corrects image information.

As described above, the color correction circuit 368 included in the signal processor 360 of the first exemplary embodiment corrects image data generated by reading the original, in accordance with a chromaticity variation of the white LEDs used as the light source in a yellow or blue direction. As a consequence, read image data whose color shift attributable to the variation in chromaticity of the white LEDs is corrected is generated.

Note that, in the first exemplary embodiment, a description has been given of a configuration in which the yellow reflector Ref_Y is used when the color correction circuit 368 in the signal processor 360 determines chromaticity of the white LEDs. Instead, another configuration is applicable in which a blue reflector Ref_B is used when the color correction circuit 368 in the signal processor 360 determines chromaticity of the white LEDs. As a b* component in image data (L*, a*, b*) converted into the L*a*b* color space is larger in a minus direction, the blue (B) exhibits higher chromaticity. For this reason, checking a b* component in image data (L*, a*, b*) on reflection light from the blue reflector Ref_B also allows determination of the chromaticity of the white LEDs, in terms of whether the yellow (Y) or the blue (B) is stronger. For this reason, the determination section 368A in the first exemplary embodiment may use the b* component of the image data (L*, a*, b*) in the L*a*b* color space on the reflection light from the blue reflector Ref_B to determine to which one (zone(n)) of the above described chromaticity regions the chromaticity of the white LEDs belongs.

Additionally, in the determination, both the yellow reflector Ref_Y and the blue reflector Ref_B may be used.

Furthermore, instead of a configuration where the yellow reflector Ref_Y or the blue reflector Ref_B is fixedly arranged, another configuration is applicable, for example, where a sheet color sample formed in the same color as the yellow reflector Ref_Y or the blue reflector Ref_B is placed on the first platen glass 301 and is read.

Additionally, the color correction circuit 368 in the signal processor 360 checks a chromaticity region (zone(n)) of the white LEDs by using a value of the b* component by use of the knowledge that chromaticity of the white LEDs is uniquely determined from the b* component in the image data (L*, a*, b*), and then corrects the value of the b* component by use of the above mentioned Equation (1), for example.

Besides the above method, the color correction circuit 368 may determine a correction coefficient in the above mentioned Equation (1), for example, based on the variation in a value of the b* component by use of the knowledge that the b* component in image data (L*, a*, b*) varies according to the chromaticity of the white LEDs, and then may correct the value of the b* component.

<Description of Internal Configuration of Signal Processor>

Figure 7:
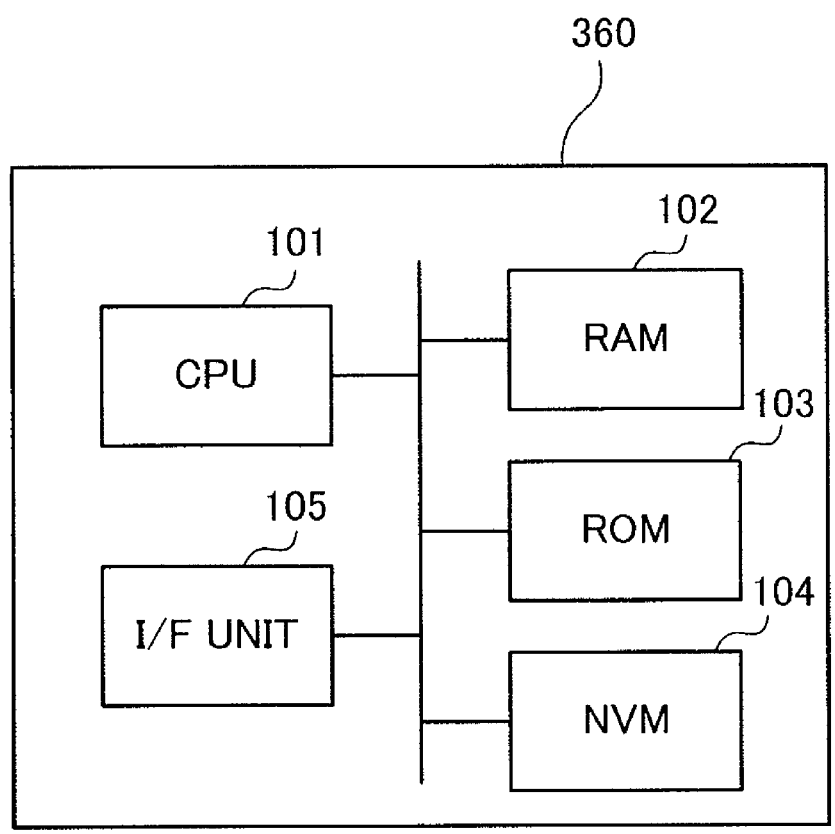
FIG. 7 is a block diagram showing an internal configuration of the signal processor.

Next, FIG. 7 is a block diagram showing an internal configuration of the signal processor 360. As shown in FIG. 7, the signal processor 360 is provided with a CPU 101, a RAM 102, a ROM 103, a non-volatile memory (NVM) 104, and an interface (I/F) unit 105. The CPU 101 executes digital calculation processing in accordance with a processing program set in advance, for processing the image signals generated by reading an original. The RAM 102 is used as a working memory or the like for the CPU 101. The ROM 103 stores therein various setting values used in the processing in the CPU 101. The non-volatile memory (NVM) 104, such as a flash memory, is a rewritable, holds data even in a case where the power supply is stopped, and is backed up by a battery. The I/F unit 105 controls an input and an output of signals with each of configuration units, such as the controller 30, the image processor 60 and the like, of the main unit 2, connected to the signal processor 360.

The CPU 101 reads the processing program from an external storage (not shown in the figure) of the main unit 2, and loads the processing program into a main memory (RAM 102), and achieves a function of each of the function units in the signal processor 360.

Note that, as another provision method on this processing program, the program may be provided while being prestored in the ROM 103, and be loaded into the RAM 102. In addition, when an apparatus is provided with a rewritable ROM 103 such as an EEPROM, only this program may be installed in the ROM 103 after the CPU 101 is set, and then may be loaded into the RAM 102. Moreover, this program may also be transmitted to the signal processor 360 through a network such as the Internet, and then installed in the ROM 103 of the signal processor 360, and further loaded into the RAM 102. In addition, the program may be loaded into the RAM 102 from an external recording medium such as a DVD-ROM, a flash memory or the like.

Second Exemplary Embodiment

In the first exemplary embodiment, a description has been given of a configuration in which a variation in the chromaticity of the white LEDs is determined by use of the b* component of the image data (L*, a*, b*) in the L*a*b* color space on the reflection light from the yellow reflector Ref_Y, for example. In the second exemplary embodiment, a description will be given of a configuration in which a variation in the chromaticity of the white LEDs is determined by use of a B component of image data (R, G, B) in an RGB color space on the reflection light from the yellow reflector Ref_Y, for example. Note that the same reference numerals will be used for the same configuration as the configuration in the first exemplary embodiment, and a detailed description thereof will be omitted herein.

<Description of Signal Processor>

A description will be given of the signal processor 360 according to the second exemplary embodiment, which processes the image signals of each color (R, G, B) generated by the CCD image sensor 340.

Figure 8:
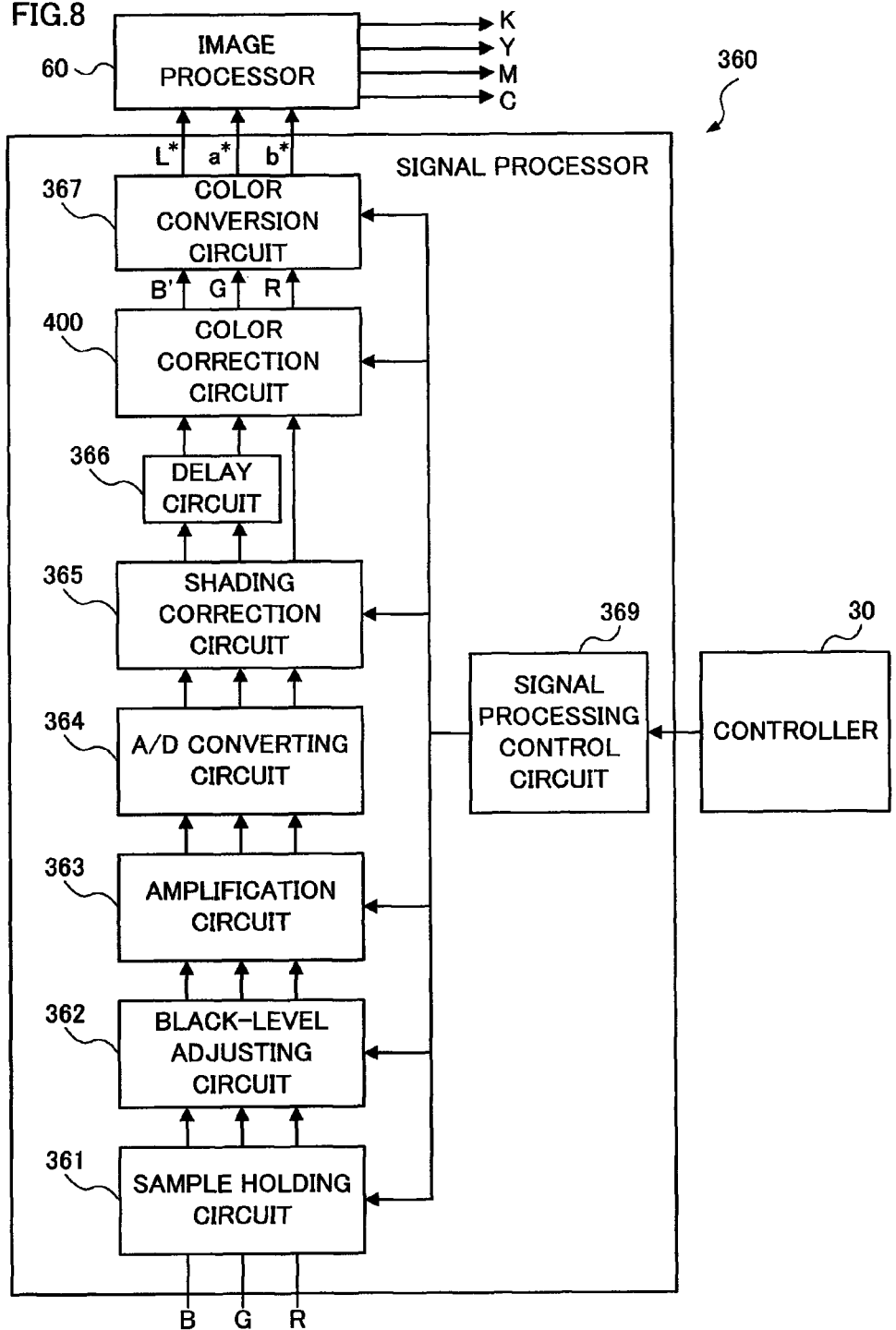
FIG. 8 is a block diagram showing a configuration of the signal processor.

FIG. 8 is a block diagram showing a configuration of the signal processor 360 of the second exemplary embodiment.

As shown in FIG. 8, the signal processor 360 of the second exemplary embodiment is provided with a color correction circuit 400 that corrects image data (R, G, B) in accordance with the chromaticity of the white LEDs constituting the lighting unit 311, in a stage before the color conversion circuit 367.

The signal processor 360 of the second exemplary embodiment determines chromaticity of the white LEDs on the basis of image data (R, G, B) acquired, for example, by reading the yellow reflector Ref_Y. Then, the signal processor 360 determines, on the basis of a result of the determination, whether it is necessary to correct the image data. Then, if it is necessary to correct the image data, the signal processor 360 further determines a correction coefficient to be used for the correction of the image data, and stores therein the determined correction coefficient.

Thereby, upon acquiring image data on the read original, the signal processor 360 performs correction processing on the image data of a pixel that requires correction, by using the stored correction coefficient.

By using the B component in image data (R, G, B) in the RGB color space on the reflection light from the yellow reflector Ref_Y, for example, the color correction circuit 400 of the second exemplary embodiment determines into which one (zone(n)) of the above described chromaticity regions chromaticity of the white LEDs falls.

As a value of the B component in the image data (R, G, B) in the RGB color space is larger, the yellow (Y) exhibits higher chromaticity. Whereas, as a value of the B component is smaller, the blue (B) exhibits higher chromaticity. For example, if a gradation of each color component is to be expressed with 256 scales, for example, the blue (B) is strong at B=0 while the yellow (Y) is strong at B=255. For this reason, checking the B component in the image data (R, G, B) allows determination of the chromaticity of the white LEDs, in terms of whether the yellow (Y) or the blue (B) is stronger. Because of this, the color correction circuit 400 in the second exemplary embodiment uses the B component in the image data (R, G, B) in the RGB color space to determine to which one (zone(n)) of the above described chromaticity regions the chromaticity of the white LEDs belongs.

Each one (zone(n)) of the chromaticity regions here is set with respect to the B component in the following manner, for example.

Specifically, a value $B_0$ of the B component is previously found as a target color coordinate in the RGB color space corresponding to the target chromaticity of the white LEDs. Furthermore, a first threshold $B_{th}1$ and a second threshold $B_{th}2$ are previously set, where $B_{th}1<B_{th}2$. Then, a range (within a color region) of plus and minus the first threshold $B_{th}1$ from the value $B_0$ of the B component corresponding to the target chromaticity, that is, a color region in which $B_0-B_{th}1 \leq B \leq B_0+B_{th}1$, is set as the chromaticity region zone(0) in association with the chromaticity of the white LEDs.

Additionally, a color region in which $B_0+B_{th}1<B \leq B_0+B_{th}2$ is set as the chromaticity region zone(−1) in association with the chromaticity of the white LEDs. Furthermore, a color region in which $B_0+B_{th}2<B$ is set as the chromaticity region zone(−2).

Additionally, a color region in which $B_0-B_{th}2 \cdot B < B_0-B_{th}1$ is set as the chromaticity region zone(1) in association with the chromaticity of the white LEDs. Furthermore, a color region in which $B < B_0-B_{th}2$ is set as the chromaticity region zone(2).

For example, upon determination that the chromaticity of the white LEDs belongs to the chromaticity region zone(0), the color correction circuit 400 determines that the correction coefficient M=1. Upon determination that the chromaticity of the white LEDs belongs to the chromaticity region zone(1), the color correction circuit 400 determines that the correction coefficient M=1.2. Upon determination that the chromaticity of the white LEDs belongs to the chromaticity region zone(2), the color correction circuit 400 determines that the correction coefficient M=1.4.

On the other hand, upon determination that the chromaticity of the white LEDs belongs to the chromaticity region zone(−1), the color correction circuit 400 determines that the correction coefficient M=0.8. Additionally, upon determination that the chromaticity of the white LEDs belongs to the chromaticity region zone(−2), the color correction circuit 400 determines that the correction coefficient M=0.6.

The color correction circuit 400 stores the determined correction coefficients M therein.

For example, if the chromaticity of the white LEDs belongs to the chromaticity region zone(0), the color correction circuit 400 judges that the image data (R, G, B) generated by reading the original has a small variation (shift) in color. Thereby, the color correction circuit 400 determines not to make any correction.

Meanwhile, if the chromaticity of the white LEDs belongs to the chromaticity region zone(1) closer to the yellow side or the chromaticity region zone(2) much closer to the yellow side, the color correction circuit 400 judges that the image data (R, G, B) generated by reading the original has a shift (is shifted) toward the blue side. Thereby, the color correction circuit 400 makes a correction of increasing the B component in the image data (R, G, B) and thus to generate a corrected value B'.

On the other hand, if the chromaticity of the white LEDs belongs to the chromaticity region zone(−1) closer to the blue side or the chromaticity region zone(−2) much closer to the blue side, the color correction circuit 400 judges that the image data (R, G, B) generated by reading the original has a shift (is shifted) toward the yellow side. Thereby, the color correction circuit 400 makes a correction of decreasing the B component in the image data (R, G, B) and thus to generate a corrected value B'.

<Description of Contents of Correction Coefficient Determination Processing>

A description will be given on contents of processing by the color correction circuit 400 to determine the correction coefficient.

Figures 2, 9:
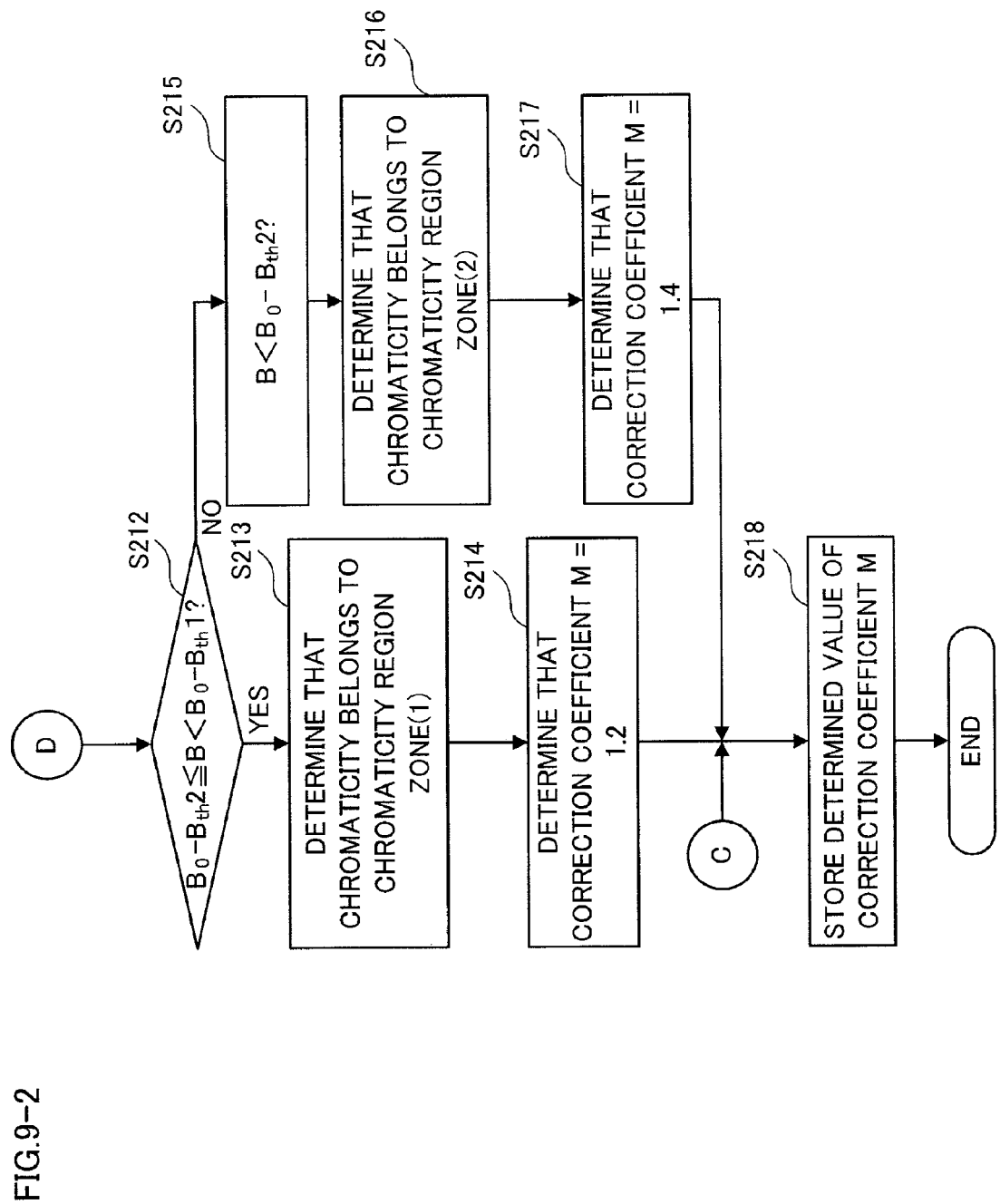

FIGS. 9-1 and 9-2 are flowcharts showing an example of contents of processing by the color correction circuit 400 to determine the correction coefficient.

First, as shown in FIG. 9-1, the color correction circuit 400 acquires, from the shading correction circuit 365 via the delay circuit 366, the image data (R, G, B) on the reflection light from the yellow reflector Ref_Y (Step 201). Then, the color correction circuit 400 extracts the B component of the image data (R, G, B), and determines to which one (zone(n)) of the above described chromaticity regions the B component belongs (Step 202).

If the determination result shows that a value of the B component satisfies $B_0-B_{th}1 \cdot B < B_0+B_{th}1$ (Yes in Step 203), the color correction circuit 400 determines that the chromaticity of the white LEDs belongs to the chromaticity region zone(0) (Step 204).

Upon determining that the chromaticity of the white LEDs belongs to the chromaticity region zone(0), the color correction circuit 400 determines that the correction coefficient M=1 (Step 205).

Meanwhile, if the value of the B component satisfies $B_0+B_{th}1 < B \cdot B_0+B_{th}2$ (No in Step 203 and Yes in Step 206), the color correction circuit 400 determines that the chromaticity of the white LEDs belongs to the chromaticity region zone(−1) (Step 207).

Upon determining that the chromaticity of the white LEDs belongs to the chromaticity region zone(−1), the color correction circuit 400 determines that the correction coefficient M=0.8 (Step 208).

Meanwhile, if the value of the B component satisfies $B_0+B_{th}2 < B$ (No in Step 206 and Yes in Step 209), the color correction circuit 400 determines that the chromaticity of the white LEDs belongs to the chromaticity region zone(−2) (Step 210).

Upon determining that the chromaticity of the white LEDs belongs to the chromaticity region zone(−2), the color correction circuit 400 determines that the correction coefficient M=0.6 (Step 211).

Subsequently, as shown in FIG. 9-2, if the value of the B component satisfies $B_0-B_{th}2 \cdot B < B_0-B_{th}1$ (No in Step 209 and Yes in Step 212), the color correction circuit 400 determines that the chromaticity of the white LEDs belongs to the chromaticity region zone(1) (Step 213).

Upon determining that the chromaticity of the white LEDs belongs to the chromaticity region zone(1), the color correction circuit 400 determines that the correction coefficient M=1.2 (Step 214).

Meanwhile, if the value of the B component satisfies $B < B_0-B_{th}2$ (which is Step 215: as a consequence of No in Step 209 and No in Step 212), the color correction circuit 400 determines that the chromaticity of the white LEDs belongs to the chromaticity region zone(2) (Step 216).

Upon determining that the chromaticity of the white LEDs belongs to the chromaticity region zone(2), the color correction circuit 400 determines that the correction coefficient M=1.4 (Step 217).

Then, the color correction circuit 400 stores therein the determined value of the correction coefficient M (Step 218), and ends the processing of determining the correction coefficient.

Thereafter, the color correction circuit 400 extracts, from the image data (R, G, B) generated by reading the original, a pixel to be subjected to correction according to a chromaticity variation of the white LEDs.

Specifically, the color correction circuit 400 determines in advance a color region of yellow that is susceptible to the chromaticity variation of the white LEDs. For example, the color correction circuit 400 determines in advance thresholds $B_{th}$, $G_{th}$, and $R_{th}$ for the respective B, G and R components, as thresholds to be used to define a color region range of yellow that is susceptible to the chromaticity variation of the white LEDs. Then, a color region in the RGB color space, satisfying B>threshold $B_{th}$, G<threshold $G_{th}$, and R<threshold $R_{th}$ is set as a correction target color region.

Then, the color correction circuit 400 extracts, from the image data (R, G, B) generated by reading the original, a pixel located in the correction target color region in the RGB color space. Then, the color correction circuit 400 adds, to image data (R, G, B) of the extracted pixel, attribute information s indicating that the pixel is a correction target (correction target pixel).

By use of the correction coefficient M determined in the processing shown in FIGS. 9-1 and 9-2, the color correction circuit 400 performs correction processing, for example with the above mentioned Equation (1), on the B component in the image data (R, G, B) of the pixel to which the attribute information s indicating that the pixel is a correction target pixel is added. With this correction, image data (R, G, B') is generated in which a color shift attributable to the chromaticity variation of the white LEDs is corrected.

The color correction circuit 400 then transmits the generated image data (R, G, B') to the color conversion circuit 367. Thereafter, the image data (R, G, B') is converted by the color conversion circuit 367 into image data (L*, a*, b*) in the L*a*b* color space, and then transferred to the image processor 60 included in the main unit 2.

In the second exemplary embodiment, the color correction circuit 400 in the signal processor 360 checks a chromaticity region (zone(n)) of the white LEDs by using the B component by use of the knowledge that chromaticity of the white LEDs is uniquely determined from the B component in the image data (R, G, B), and then corrects the value of the B component by use of the above mentioned Equation (1), for example.

Besides the above method, the color correction circuit 400 may determine a correction coefficient in the above mentioned Equation (1), for example, based on the variation in a value of the B component by use of the knowledge that the B component in image data (R, G, B) varies according to the chromaticity of the white LEDs, and then may correct the value of the B component.

As described above, in the image scanner 3 of the second exemplary embodiment, the color correction circuit 400 included in the signal processor 360 corrects image data generated by reading the original, in accordance with a chromaticity variation of the white LEDs used as the light source in a yellow or blue direction. As a consequence, read image data whose color shift attributable to the variation in chromaticity of the white LEDs is corrected is generated. Thereby reduction in accuracy of reading colors is suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a light source that generates light by synthesizing light from different illuminants, and that irradiates an irradiated object with the light thus generated;
   a reading unit that reads light irradiated by the light source and reflected by the irradiated object, and that generates image information on the irradiated object;
   a correction amount setting unit that acquires from the reading unit the image information generated by using, as the irradiated object, a color sample formed in a color of light emitted by any one of the illuminants generating the light of the light source, and that sets, according to the image information thus acquired, a correction amount to correct the image information on the irradiated object generated by the reading unit; and
   a correction unit that corrects the image information on the irradiated object generated by the reading unit, by using the correction amount set by the correction amount setting unit,
   wherein the correction amount setting unit sets the correction amount to correct the image information on the irradiated object, in response to determining that color coordinates of the image information on the color sample are located outside of a predetermined color region in a color space including the color coordinates.

2. The image reading apparatus according to claim 1, wherein the correction amount setting unit obtains chromaticity of the light source from the image information on the color sample, and sets the correction amount to correct the image information on the irradiated object when the chromaticity exceeds a predetermined chromaticity range.

3. The image reading apparatus according to claim 1, wherein the correction amount setting unit obtains chromaticity of the light source from the image information on the color sample, and sets the correction amount different according to a shift amount of the chromaticity from a target value.

4. The image reading apparatus according to claim 1, wherein the correction amount setting unit sets the correction amount different according to shift amounts of color coordinates of the image information on the color sample from predetermined target color coordinates in a color space including the color coordinates.

5. The image reading apparatus according to claim 1, wherein the correction unit extracts a correction target pixel from the image information on the irradiated object generated by the reading unit, and corrects the image information on the correction target pixel by use of the correction amount.

6. The image reading apparatus according to claim 5, wherein the correction unit extracts the correction target pixel in a predetermined color range, from the image information on the irradiated object generated by the reading unit.

7. The image reading apparatus according to claim 1, wherein
   the light source includes a white light-emitting diode that generates white light by synthesizing light of a first color emitted by a first illuminant, and light of a second color emitted by a second illuminant, and
   the correction amount setting unit sets the correction amount in accordance with the image information on at least any one of the color sample formed in the first color and the color sample formed in the second color.

8. The image reading apparatus according to claim 7, wherein the first illuminant is a blue LED chip which emits blue light.

9. The image reading apparatus according to claim 7, wherein the second illuminant is a transparent resin including a yellow fluorescent material which emits yellow light.

10. The image reading apparatus according to claim 1, wherein the predetermined color region in the color space is a predetermined chromaticity range with a target chromaticity point at a center of the predetermined chromaticity.

11. The image reading apparatus according to claim 1, wherein if color coordinates of the image information on the color sample are located inside of the predetermined color region in the color space including the color coordinates, no correction of the image information on the irradiated object occurs.

12. An image forming apparatus comprising:
an image reading function unit that reads an image from an irradiated object and that generates image information; and
an image forming function unit that forms an image on the basis of the image information generated by the image reading function unit, wherein
the image reading function unit includes:
a light source that generates light by synthesizing light from different illuminants, and irradiates the irradiated object with the generated light;
a reading unit that reads light irradiated by the light source and reflected by the irradiated object, and that generates image information on the irradiated object;
a correction amount setting unit that acquires from the reading unit the image information generated by using, as the irradiated object, a color sample formed in a color of light emitted by any one of the illuminants that generate the light of the light source, and that sets, according to the acquired image information, a correction amount to correct the image information on the irradiated object generated by the reading unit; and
a correction unit that corrects the image information on the irradiated object generated by the reading unit, by using the correction amount set by the correction amount setting unit,
wherein the correction amount setting unit sets the correction amount to correct the image information on the irradiated object, in response to determining that color coordinates of the image information on the color sample are located outside of a predetermined color region in a color space including the color coordinates.

13. The image forming apparatus according to claim 12, wherein the correction amount setting unit of the image reading function unit obtains chromaticity of the light source from the image information on the color sample, and sets the correction amount to correct the image information on the irradiated object when the chromaticity exceeds a predetermined chromaticity range.

14. The image forming apparatus according to claim 12, wherein the correction unit of the image reading function unit extracts a correction target pixel from the image information on the irradiated object generated by the reading unit, and corrects the image information on the correction target pixel by use of the correction amount.

15. The image forming apparatus according to claim 12, wherein the light source of the image reading function unit includes a white light-emitting diode that generates white light by synthesizing light of a first color emitted by a first illuminant, and light of a second color emitted by a second illuminant, and
the correction amount setting unit of the image reading function unit sets the correction amount in accordance with the image information on at least any one of the color sample formed in the first color and the color sample formed in the second color.

16. An image information correction method comprising:
acquiring image information that is generated on the basis of reflected light by an irradiated object irradiated with light by a light source generating the light by synthesizing light from different illuminants;
acquiring the image information generated by using, as the irradiated object, a color sample formed in a color of light emitted by any one of the illuminants generating the light of the light source;
setting, according to the image information on the color sample thus acquired, a correction amount to correct the image information on the irradiated object; and
correcting the image information on the irradiated object by using the correction amount,
wherein the setting the correction amount to correct the image information on the irradiated object occurs in response to determining that color coordinates of the image information on the color sample are located outside of a predetermined color region in a color space including the color coordinates.

17. A non-transitory computer readable medium storing a program that causes a computer to execute a process for image information correction, the process comprising:
acquiring image information that is generated on the basis of reflected light by an irradiated object irradiated with light by a light source generating the light by synthesizing light from different illuminants;
acquiring the image information generated by using, as the irradiated object, a color sample formed in a color of light emitted by any one of the illuminants generating the light of the light source;
setting, according to the image information on the color sample thus acquired, a correction amount to correct the image information on the irradiated object; and
correcting the image information on the irradiated object by using the correction amount,
wherein the setting the correction amount to correct the image information on the irradiated object occurs in response to determining that color coordinates of the image information on the color sample are located outside of a predetermined color region in a color space including the color coordinates.

\* \* \* \* \*